United States Patent
Wysocki et al.

(10) Patent No.: US 9,488,531 B2
(45) Date of Patent: Nov. 8, 2016

(54) LOSS COMPENSATION FOR DISTRIBUTED SENSING IN DOWNHOLE ENVIRONMENTS

(71) Applicants: Paul F. Wysocki, Blacksburg, VA (US); Christopher H. Lambert, Blacksburg, VA (US); Ashwin Chandran, Christiansburg, VA (US)

(72) Inventors: Paul F. Wysocki, Blacksburg, VA (US); Christopher H. Lambert, Blacksburg, VA (US); Ashwin Chandran, Christiansburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 173 days.

(21) Appl. No.: 14/011,067

(22) Filed: Aug. 27, 2013

(65) Prior Publication Data

US 2015/0063418 A1    Mar. 5, 2015

(51) Int. Cl.
G01K 11/32 (2006.01)
E21B 47/12 (2012.01)
G01J 5/08 (2006.01)
G02B 6/44 (2006.01)
G01D 5/353 (2006.01)

(52) U.S. Cl.
CPC ............ *G01K 11/32* (2013.01); *E21B 47/123* (2013.01); *G01J 5/0821* (2013.01); *G01D 5/353* (2013.01); *G01D 5/35303* (2013.01); *G01K 2011/324* (2013.01); *G02B 6/4492* (2013.01)

(58) Field of Classification Search
CPC . G01K 15/0821; G01K 11/32; E21B 47/123
USPC ........................................................ 374/161
See application file for complete search history.

(56) References Cited

U.S. PATENT DOCUMENTS

| | | | |
|---|---|---|---|
| 4,767,219 A | 8/1988 | Bibby | |
| 5,721,615 A * | 2/1998 | McBride | G01D 5/35303 356/477 |
| 6,807,324 B2 * | 10/2004 | Pruett | G01K 15/002 374/E11.015 |

(Continued)

OTHER PUBLICATIONS

Notification of Transmittal of the International Search Report and the Written Opinion of the International Searching Authority; PCT/US2014/047796; Mailed Nov. 12, 2014; Korean Intellectual Property Office; 10 pages.

(Continued)

*Primary Examiner* — Yara B Green
(74) *Attorney, Agent, or Firm* — Cantor Colburn LLP

(57) ABSTRACT

An apparatus for estimating a parameter includes: an optical fiber sensor including at least one optical fiber configured to be disposed in a downhole location and including at least one sensing location configured to generate measurement signals; at least one light source configured to transmit a measurement signal having a wavelength to interrogate a sensing location and cause the sensing location to return a reflected measurement signal indicative of a measured parameter, and configured to transmit a reference signal and cause a reflected reference signal to be returned from a location associated with the sensing location, the reflected reference signal having a known relationship to hydrogen concentration; and a processor configured to receive the reflected measurement signal and the reflected reference signal, estimate the hydrogen concentration based on the reflected reference signal, and calibrate the first reflected signal based on the estimated hydrogen concentration.

20 Claims, 5 Drawing Sheets

(56) References Cited

U.S. PATENT DOCUMENTS

| | | | |
|---|---|---|---|
| 7,539,361 B2* | 5/2009 | Dimmick | G01K 11/3206 385/12 |
| 8,757,870 B2* | 6/2014 | Hall | G01K 11/32 356/43 |
| 2006/0115204 A1* | 6/2006 | Marsh | E21B 47/065 385/12 |
| 2008/0056639 A1* | 3/2008 | MacDougall | E21B 47/065 385/12 |
| 2008/0273852 A1 | 11/2008 | Parker et al. | |
| 2009/0210168 A1 | 8/2009 | Vincelette et al. | |
| 2011/0048136 A1 | 3/2011 | Birch et al. | |
| 2012/0039561 A1 | 2/2012 | Macdougall et al. | |
| 2012/0147924 A1* | 6/2012 | Hall | G01K 13/10 374/161 |
| 2013/0003777 A1 | 1/2013 | Jaaskelainen et al. | |
| 2014/0290335 A1* | 10/2014 | Shanks | 73/25.05 |

OTHER PUBLICATIONS

Datta et al., "Peformance Evaluation of Temperature Sensing System Based on Distributed Anti-Stockes Raman Thermometry", Optical Society of America, OSA, BGPP, Sensors 2010, 2 pages.

Hartog, "Raman-Based Distributed Temperature Sensors", Optical Society of America, 2010 OSA/FiO/LS 2010, 2 pages.

* cited by examiner

LOSS COMPENSATION FOR DISTRIBUTED SENSING IN DOWNHOLE ENVIRONMENTS

BACKGROUND

Fiber-optic sensors have been utilized in a number of applications, and have been shown to have particular utility in sensing parameters in various environments. Optical fiber sensors can be incorporated into environments such as downhole environments and be used to sense various parameters of an environment and/or the components disposed therein, such as temperature, pressure, strain and vibration. An exemplary temperature sensing system is a Distributed Temperature Sensing (DTS) system, which utilizes fiber optic cables or other devices capable of measuring temperature values at multiple locations along the length of a wellbore. DTS can be used to measure, for example, a continuous temperature profile along the wellbore.

Some Distributed Temperature Sensing (DTS) systems for use downhole utilize Spontaneous Raman Scattering (SRS) in optical fibers to measure temperature. The relative amount of Stokes and Anti-Stokes light generated by SRS is dependent on temperature. The Stokes and Anti-Stokes wavelengths differ from the initial laser wavelength and so can be separately detected and compared in order to compute the temperature along the fiber. Errors in calibration can occur as a result of conditions other than temperature causing changes in loss of the Stokes and anti-Stokes wavelengths.

SUMMARY

An apparatus for estimating a parameter includes: an optical fiber sensor including at least one optical fiber configured to be disposed in a downhole location, the at least one optical fiber including at least one sensing location disposed along the optical fiber and configured to generate measurement signals; at least one light source configured to transmit a measurement signal having a wavelength to interrogate a sensing location and cause the sensing location to return a reflected measurement signal indicative of a measured parameter, and configured to transmit a reference signal and cause a reflected reference signal to be returned from a location associated with the sensing location, the reflected reference signal having a known relationship to hydrogen concentration; and a processor configured to receive the reflected measurement signal and the reflected reference signal, estimate the hydrogen concentration based on the reflected reference signal, and calibrate the first reflected signal based on the estimated hydrogen concentration.

A method for estimating a parameter includes: disposing at least one optical fiber in a downhole location, the at least one optical fiber including at least one sensing location disposed along the optical fiber and configured to generate measurement signals; transmitting a measurement signal having a wavelength into the at least one optical fiber to interrogate a sensing location and cause the sensing location to return a reflected measurement signal indicative of a measured parameter; transmitting a reference signal and causing a reflected reference signal to be returned from a location associated with the sensing location, the reflected reference signal having a known relationship to hydrogen concentration; and receiving the reflected measurement signal and the reflected reference signal, estimating the hydrogen concentration based on the reflected reference signal, and calibrating the first reflected signal based on the estimated hydrogen concentration.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Systems and methods for downhole sensing and correction of downhole optical fiber measurements are provided. An embodiment of a system includes a distributed sensing system such as a distributed temperature sensing (DTS) system that includes one or more optical fiber sensors. The system includes a processing device for receiving at least a reflected measurement signal and a reflected reference signal from one or more optical fiber sensors. A measurement signal is reflected from a sensing location in an optical fiber, such as a Raman Scattering or other intrinsic scattering location, or a Bragg grating. The reference signal is reflected from a location in the optical fiber or another optical fiber corresponding to the sensing location. The measurement signal provides an indication of a parameter to be measured (e.g., temperature) and the reference signal provides an indication of another parameter different from the measured parameter that has an effect on loss of the measurement signal (e.g., loss of intensity of Stokes and/or Anti-Stokes wavelengths).

In one embodiment, the reference signal loss is due primarily to a parameter such as hydrogen absorption, where measurement signal loss is due to both the measured parameter and at least the other parameter. For example, the reflected measurement signal has a wavelength or wavelength range that is sensitive to loss due the measured parameter. The reference signal and reflected reference signal have a wavelength or wavelengths that experience loss primarily or substantially only based on a concentration of hydrogen in the optical fiber sensor. In another example, the system includes a measurement optical fiber having a lower sensitivity to hydrogen diffusion or other condition than a separate reference optical fiber. The reference signal (having the same or a different wavelength than measurement signal) is transmitted into the reference optical fiber to determine the rate and/or amount of hydrogen diffusion. The parameters measured by the reference signal may be used to correct or calibrate the measurement signal from the first optical fiber.

Figure 1:
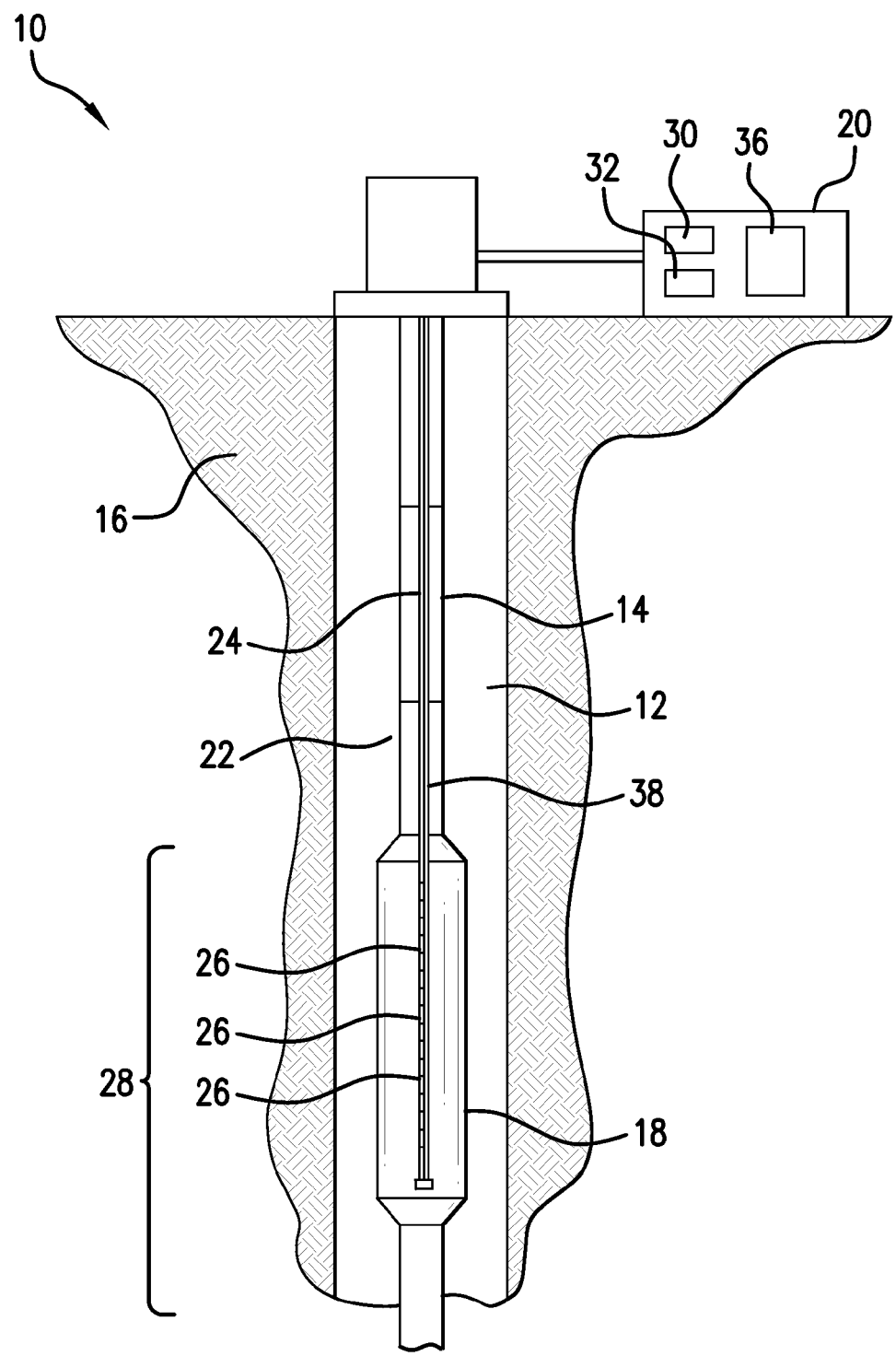
FIG. 1 illustrates an exemplary embodiment of a downhole drilling, monitoring, evaluation, exploration and/or production system.

Referring to FIG. 1, an exemplary embodiment of a downhole drilling, monitoring, evaluation, exploration and/or production system 10 disposed in a wellbore 12 is shown. A borehole string 14 is disposed in the wellbore 12, which penetrates at least one earth formation 16 for performing functions such as extracting matter from the formation and/or making measurements of properties of the formation 16 and/or the wellbore 12 downhole. The borehole string 14 is made from, for example, a pipe, multiple pipe sections or flexible tubing. The system 10 and/or the borehole string 14 include any number of downhole tools 18 for various processes including drilling, hydrocarbon production, and measuring one or more physical quantities in or around a borehole. Various measurement tools 18 may be incorporated into the system 10 to affect measurement regimes such as wireline measurement applications or logging-while-drilling (LWD) applications.

In one embodiment, a distributed temperature sensing (DTS) system is included as part of the system 10 and is configured to measure or estimate temperature along the borehole 14, the tool 18 and/or other downhole components. The DTS system includes an optical interrogator or measurement unit 20 connected in operable communication with at least one optical fiber sensing assembly 22. The measurement unit 20 may be located, for example, at a surface location, a subsea location and/or a surface location on a marine well platform or a marine craft. The measurement unit 20 may also be incorporated with the borehole string 12 or tool 18, or otherwise disposed downhole as desired.

The optical fiber sensing assembly 22 is operably connected to the measurement unit 20 and is configured to be disposed downhole. The optical fiber assembly 22 includes at least one optical fiber 24 configured to take a distributed measurement of a downhole parameter (e.g., temperature, pressure, stress, strain and others). The optical fiber 24 includes one or more sensing locations 26 disposed along a length of the sensor core, which are configured to reflect and/or scatter optical interrogation signals transmitted by the measurement unit 20. Examples of sensing locations 26 include fibre Bragg gratings, Fabry-Perot cavities, partially reflecting mirrors, and locations of intrinsic scattering such as Rayleigh scattering, Brillouin scattering and Raman scattering locations.

In one embodiment, a length of the optical fiber sensing assembly 22 defines a measurement region 28 along which distributed parameter measurements may be taken. For example, the measurement region 28 extends along a length of the assembly that includes sensing locations 26. The measurement region 28 may correspond to the length of a tool or other component, or extend along the entire string or along one or more portions of the string.

The measurement unit 20 includes, for example, one or more electromagnetic signal sources 30 such as a tunable light source, a LED and/or a laser, and one or more signal detectors 32 (e.g., photodiodes). Signal processing electronics may also be included in the measurement unit 20, for processing the signals received at the detectors 32. In one embodiment, a processing unit 34 is in operable communication with the signal source 30 and the detector 32 and is configured to control the source 30, receive reflected signal data from the detector 32 and/or process reflected signal data.

In one embodiment, the sensing assembly 22 and the measurement unit are configured as a Distributed Temperature Sensing (DTS) system. The DTS system utilizes Spontaneous Raman Scattering (SRS) in the optical fiber 24 to measure temperature. Raman back-scatter is caused by molecular vibration in the optical fiber as a result of incident light, which causes emission of photons that are shifted in wavelength relative to the incident light. Positively shifted photons, referred to as Stokes back-scatter, are independent of temperature. Negatively shifted photons, referred to as Anti-Stokes back-scatter, are dependent on temperature. Accordingly, an intensity ratio of Stokes to Anti-Stokes back-scatter may be used to calculate temperature.

The relative amount of Stokes and Anti-Stokes light generated by SRS is dependent in a predictable way on temperature. The Stokes and anti-Stokes wavelengths differ from the initial laser wavelength and from each other. For example, for a pulse launched at 1064 nm, the Stokes wavelength is approximately 1117 nm while the anti-Stokes wavelength is approximately 1016 nm. Scattered light generated at these wavelengths can be easily separated by an optical filter and measured separately each time a 1064 nm pulse is launched into the fiber. By deducing the magnitude of scattered light at each wavelength as a function of position in the fiber (e.g., utilizing standard OTDR type techniques) it is then possible to measure the change in this scattering relative to a known reference condition and hence the change in temperature relative to the temperature when that baseline measurement was recorded.

Various conditions in addition to the measured parameter (e.g., temperature) can also have an effect on the measurement signal and thus effect measurement of the parameter. For example, one major source of differential loss in downhole systems is hydrogen induced loss caused by hydrogen ingress or diffusion at high temperatures. For example, if the Stokes and anti-Stokes wavelengths experience different changes in loss for other reasons relative to the loss present when a calibration baseline was recorded, the temperature computed is in error. Such changes in loss cause changes in measured Stokes and Anti-Stokes power as a function of position, which can be incorrectly interpreted as temperature changes.

In order to account for changes in the measurement signals due to parameters other than the measured parameter, the system 10 includes an apparatus or system that estimates the loss or other change in reflected measurement signals due to other parameters and/or estimates the changes of such other parameters during measurement.

In one embodiment, the measurement unit 20 is configured to launch an interrogation or measurement signal having selected wavelength(s) into the optical fiber 24 for measurement of a parameter of interest such as temperature (referred to as the measured parameter). In one embodiment, the sensing locations 26 are Raman backscattering locations. The unit 20 receives return signals (referred to as reflected measurement signals) from each sensing location 26 and estimates the temperature or other measured parameter based on the return signals for each location. The location of each return signal may be associated with its respective location on the fiber, typically corresponding to depth, using any suitable technique, such as optical time domain reflectometry (OTDR).

The unit also transmits a reference interrogation signal (referred to as a reference signal) into the sensor assembly 22. The reference signal can be transmitted into the optical fiber 24 or into a reference optical fiber 38. The reference optical fiber can be co-located with the measurement optical fiber 24 (e.g., disposed together in a cable), or otherwise positioned so that corresponding depth locations can be identified. The reference signal causes a reflected or return reference signal to be returned to the unit 20.

An exemplary DTS system launches pulses from one laser and measures generated SRS light, switching between the Stokes and anti-Stokes wavelength to calculate the ratio and compute temperature. The reference signal may be transmitted by launching a low power laser pulse near, e.g., 1240 nm or some other wavelength where molecular hydrogen produces losses. The reference signal system can be a simple optical time domain reflectometer at a wavelength such as about 1240 nm, resolving hydrogen induced loss vs. position at each pulse time.

In order to launch the measurement signal and reference signal, and process the return signals, various optical filtering and switching techniques could be used that would allow all three wavelengths (Stokes, anti-Stokes and hydrogen measuring wavelength) to be measured by the same system.

In one embodiment, the hydrogen loss (or loss due to another parameter) measurement is performed in a second auxiliary fiber, e.g., reference optical fiber 38, in the same or similar location with similar or different characteristics. For example, the auxiliary fiber might be optimized for increased sensitivity to hydrogen induced loss or for fast time response to a hydrogen atmosphere. A DTS system designed with this embellishment could be substantially more accurate in environments with substantial hydrogen ingress. An exemplary optical fiber having a loss that is exclusively or primarily dependent on hydrogen concentration is Baker Hughes' CoreBright™ fiber.

Figure 2:
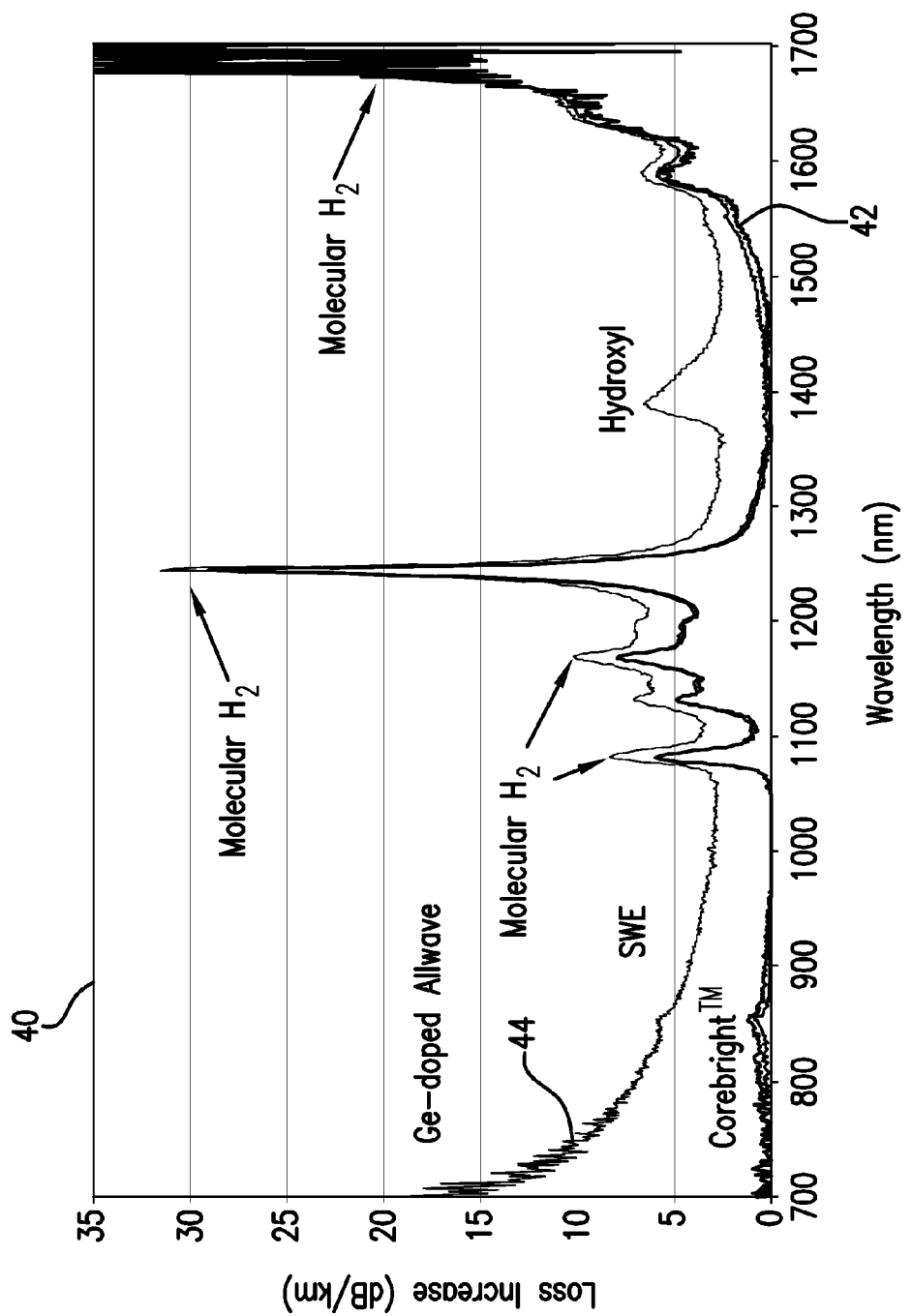
FIG. 2 shows a plot of loss characteristics of exemplary optical fibers.

FIG. 2 illustrates signal loss in different types of optical fibers that may be used in the system 10. A loss plot 40 shows the signal loss as a function of wavelength of an un-doped, substantially pure silica core optical fiber (e.g., a CoreBright™ fiber). This fiber may be used as a reference fiber for calibration of a measurement fiber. The loss spectrum of the un-doped fiber is shown as curve 42. The loss plot 40 also includes a curve 44 showing the loss spectrum of a doped optical fiber, such as an optical fiber having a Germanium doped core. In addition to curves 42 and 44, a third loss plot is shown in FIG. 2, which corresponds to another un-doped, substantially pure core fiber.

As shown in FIG. 2, the curve 42 has peaks corresponding to losses due to molecular hydrogen in the fiber, and also demonstrates that signals having different wavelengths exhibit different sensitivities to hydrogen. The losses shown by the peaks (labeled as "Molecular $H_2$" in FIG. 2) in curve 42 are solely or at least substantially due to the presence of molecular hydrogen. The losses are not significantly affected by other parameters or conditions.

Figure 3:
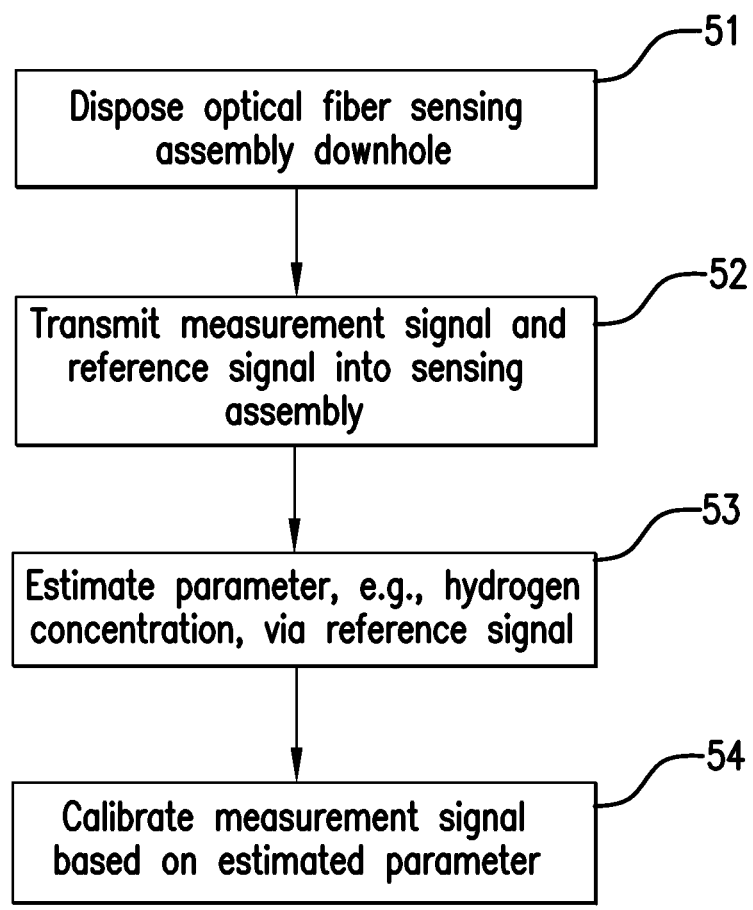
FIG. 3 is a flow chart illustrating an exemplary embodiment of a method of performing and/or calibrating a distributed downhole parameter measurement.

In contrast, the curve 44 exhibits losses due not only to hydrogen, but also due to other factors. Such additional losses include permanent losses in the optical fiber. For example, the curve 44 shows additional losses associated with dopant (e.g., germanium) deficient-type defects along the fiber, which can be referred to as short wavelength edge (SWE)-induced loss. Another source of loss is the presence of hydroxyl (OH) groups in the fiber. In the example of FIG. 3, a loss peak due to OH groups is evident at around 1400 nm.

One embodiment includes a measurement optical fiber such as a Ge-doped single mode fiber for transmission of measurement signals having a selected wavelength (e.g., near 1064 nm or near 1550 nm), and an un-doped reference fiber such as a pure silica core fiber co-located with the measurement fiber. For example, the measurement fiber and reference fiber are deployed as part of a single cable or otherwise deployed so that the positions and depths of each fiber can be correlated. The measurement and reference fibers have loss characteristics similar to those shown in FIG. 2.

As discussed further below (e.g., shown in FIG. 4), the shape of hydrogen induced loss in the pure silica core fiber is temperature dependent, thus temperature should be known to correct for the molecular induced hydrogen loss. For example, a measurement of hydrogen near the peak at 1240 nm shows a very rapid temperature dependence, which means that one should know the temperature in order to use this correction to predict the hydrogen loss at other wavelengths of use.

The reference fiber, which only has molecular hydrogen loss, allows for easy measurement of the hydrogen present in the fiber at a given time and position by estimating the loss in the reference fiber. This allows for the estimation of hydrogen in the measurement fiber and the corresponding proportion of the loss in the measurement fiber due to hydrogen, which would otherwise be difficult to estimate. This information may be used to more accurately calibrate the system to account for changes in hydrogen levels by, e.g., diffusion.

FIG. 3 illustrates a method 50 of measuring downhole parameters. The method 50 includes one or more stages 51-54. Although the method 50 is described in conjunction with the system 10 and the measurement system described above, the method 50 is not limited to use with these embodiments, and may be performed by the measurement unit 20 or other processing and/or signal detection device. In one embodiment, the method 50 includes the execution of all of stages 51-54 in the order described. However, certain stages may be omitted, stages may be added, or the order of the stages changed.

In the first stage 51, the optical fiber sensing assembly 22 along with the borehole string 12, tool 18 and/or other components are lowered downhole. The components may be lowered via, for example, a wireline or a drillstring.

In the second stage 52, measurement signals including pulses of light having a selected wavelength or wavelength range are generated by the light source 34 and sent to the optical fiber 24.

For example, the measurement signals are transmitted with a wavelength at or near 1064 nm. In one embodiment, the wavelength or wavelength range is selected based on knowledge of parameters or conditions other than the measurement parameter that cause loss or otherwise affect the measurement signal. Such parameters or condition should be corrected for in order to provide an accurate measurement. For example, based on the composition of a given fiber (and prior to disposing the fiber downhole) a relationship between signal loss for a given wavelength and a particular parameter such as hydrogen concentration can be estimated. Once the hydrogen concentration is determined downhole using a reference signal, the amount of loss due to the hydrogen concentration can be calculated and used to correct the reflected measurement signals.

In one embodiment, the measurement signals are transmitted at a wavelength for which a significant source of loss is known. For example, the interrogation wavelengths are selected from those for which the presence of molecular hydrogen is a main source of loss in addition to temperature, e.g., around 1064 nm or around 1550 nm. Thus, if the amount of hydrogen in a fiber at which a reflected measurement signal is generated is known, the amount of loss at the reflected measurement signal (e.g., at the Stokes and Anti-Stokes wavelengths) can be calculated.

In the third stage 53, one or more parameters other than the measured parameter are measured using the DTS system and/or an additional apparatus or system disposed with the DTS system. In one embodiment, a reference signal is transmitted into the optical fiber 24 or a reference optical fiber. This signal is used to estimate the amount of hydrogen in the optical fiber 24 at various times and depths for use in correcting the measurements performed in stage 52.

The amount of hydrogen in the optical fiber 24 at each measurement location at or around the time of interrogation is estimated. Measurement of the molecular hydrogen in the fiber 24 at a given location is performed at a particular wavelength utilizing any suitable technique for associating return reference signals with location or distance, such as OTDR.

In one embodiment, the reference interrogation signal is transmitted with a wavelength or wavelength range at or near a known hydrogen absorption peak. For example, the loss in fibers due to molecular hydrogen can be measured using pulses at 1240 nm. Then, the loss change at the Stokes and anti-Stokes wavelengths can be computed based on the measurement at 1240 nm, by using the ratio of loss between the wavelengths. For example, the loss associated with the signal returned based on the reference signal is computed by using the ratio of loss at these wavelength in the molecular hydrogen spectrum.

Various wavelengths can be used to detect hydrogen concentration, depending on temperatures and fiber types. Such wavelengths can be identified based on absorption peaks generated by testing various fibers.

In one example, reference signals having wavelengths around 1240 nm and/or 1900 nm are used for measuring hydrogen absorption. Molecular hydrogen in glass causes absorption peaks near 1240 nm and 1900 nm that have long tails into useful DTS wavelength ranges. This absorption is completely reversible, i.e., the hydrogen can be driven out of the fiber and the loss eliminated. At other wavelengths, hydrogen reactions may create permanent losses that are not reversible. In this example, the molecular hydrogen level is estimated as a function of position under the assumption that molecular hydrogen is a reversible loss mechanism and that the absorption spectrum of molecular hydrogen is predictable. The estimated hydrogen level can be used to correct DTS measurements, thus avoiding the need for more complex systems such as dual-ended systems.

Loss due to hydrogen concentration is also dependent on the temperature. Thus, in one embodiment, the hydrogen concentration is estimated based on the wavelength of the reference signal and the reflected reference signal, the location from which the reflected reference signal was generated, and the temperature at the location. The temperature may be estimated using any suitable device or technique, such as using previous measurements associating depth with temperature, or using downhole measurement devices such as optical fiber devices (e.g., DTS) or discrete devices such as P/T gauges.

Figure 4:
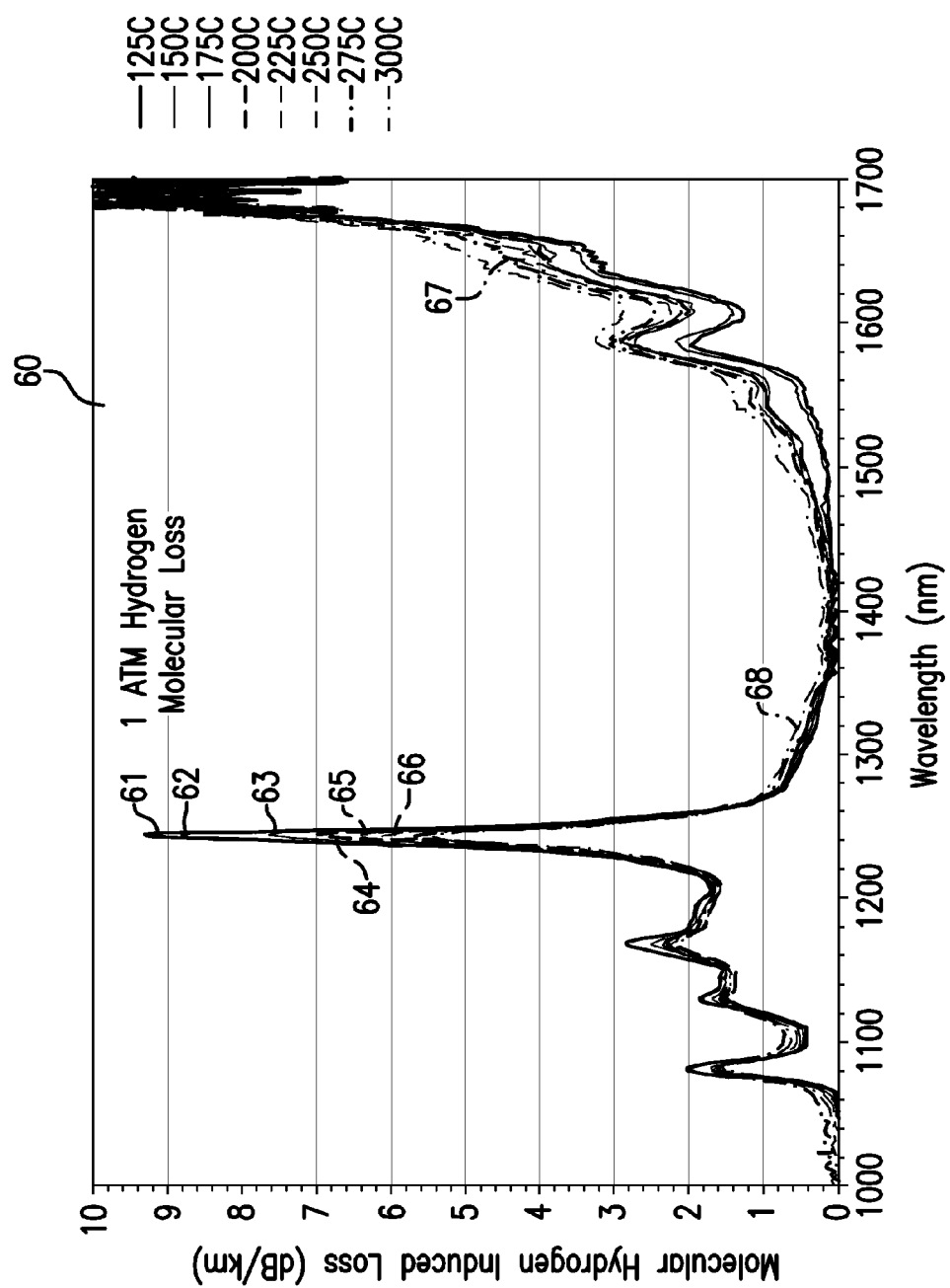
FIG. 4 shows a plot of loss characteristics of an exemplary optical fiber.

An example of such temperature dependence is shown in FIG. 4. A loss plot 60 shows the loss due to molecular hydrogen as a function of temperature for the reference optical fiber discussed in conjunction with FIG. 3. The loss plot shows a loss spectrum for various temperatures. Curves 61-68 show the loss spectrum at 125° C., 150° C., 175° C., 200° C., 225° C., 250° C., 275° C. and 300° C., respectively. As is evident, the amount of loss increases with temperature.

An exemplary auxiliary or reference fiber includes a core that is pure or at least substantially pure silica. The reference interrogation signal is transmitted with a wavelength at or near 1240 nm, at which the only or primary signal loss cause is hydrogen diffusion.

In one embodiment, the reference signal is transmitted in the same fiber 24 that is used for the DTS measurement, thus avoiding the need for an added fiber or a turnaround device downhole. In another embodiment, the reference signal is transmitted in a second or auxiliary optical fiber disposed at or near the first fiber 24.

The auxiliary fiber can have the same or different characteristics as the measurement fiber. For example, the auxiliary fiber may be configured for Raman backscatter so that changes in the Stokes and Anti-Stokes signals can be used to correct the measurement signals.

In one embodiment, the auxiliary fiber is configured to have increased sensitivity to a parameter such as hydrogen diffusion to facilitate measuring the parameter. For example, the auxiliary fiber is configured to have increased sensitivity to hydrogen induced loss. In another example, the auxiliary fiber can have characteristics causing it to have a faster response to exposure to hydrogen (e.g., absorb hydrogen faster than the measurement fiber.

For example, a DTS measurement fiber might be carbon coated to resist hydrogen ingress, but a reference fiber is not carbon coated or has a thinner coat. The reference fiber provides a fast responding system for measuring the environmental hydrogen. The DTS fiber would respond more slowly, but the faster responding reference fiber can be used to predict future hydrogen induced loss.

Another embodiment includes controllably adding hydrogen to a cable or other carrier to maintain the same loss using the reference fiber to monitor hydrogen concentration. The reference fiber acts as a control mechanism or monitoring fiber in a control loop, which is used by a processor such as the measurement unit 20 to control the amount of hydrogen added to the cable and the measurement fiber to maintain a selected hydrogen concentration, e.g., the concentration present when the measurement fiber was initially calibrated. For example, a DTS fiber could be calibrated in the presence of hydrogen. When deployed, the hydrogen monitoring fiber could be used to detect the actual hydrogen level present downhole. Hydrogen could be controllably added to maintain the design level used in the initial calibration process.

In the fourth stage 54, the amount of hydrogen or other parameter measurement as a function of location and time is used to correct the measurement signals. When the amount of hydrogen is known, the loss at wavelengths corresponding to the Stokes and anti-Stokes wavelengths of the measurement signal is calculated. The loss in the Stokes and Anti-Stokes wavelengths are used to calibrate or correct a prior calibration.

In one embodiment, the reference measurements can be used to measure hydrogen absorption as well as provide predictions regarding hydrogen absorption at later times. For example, the reference fiber is configured to absorb hydrogen at a greater rate than the measurement fiber, e.g., by configuring the reference fiber to have a thinner carbon or other hydrogen protective coating than the measurement fiber or by configuring the reference fiber to have a thinner cladding than the measurement fiber. In this embodiment, the hydrogen diffusion measurement is taken over some time period and a rate of diffusion into the reference fiber is estimated. By knowing the relative characteristics of the fibers, a diffusion model or prediction is generated for the measurement fiber that predicts the hydrogen concentration of the measurement fiber at future times, which can be used in future calibrations.

In one embodiment, the measurement signals and reference reflected signals are used to calculate the hydrogen absorption while taking into account response variations of the reference signal depending on temperature. The measurement signals can be calibrated using the reference signals and knowing the hydrogen absorption characteristics of the wavelengths (Stokes, Anti-Stokes and reflected reference wavelength) based on temperature.

Figure 5:
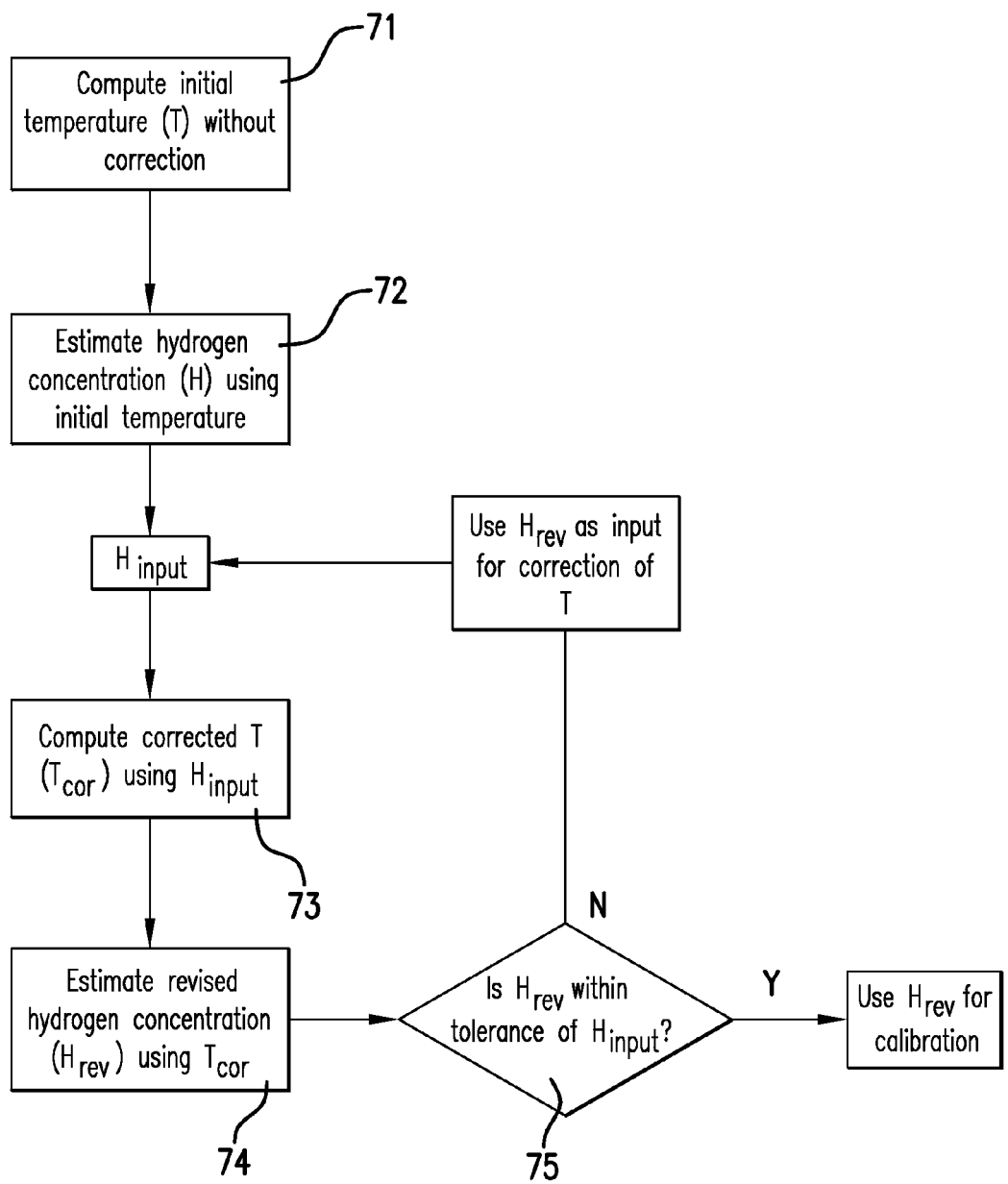
FIG. 5 is a flow chart illustrating an exemplary embodiment of a method of calibrating a distributed temperature measurement.

An example of a calibration method 70 for a temperature measurement system (e.g., a DTS system) is shown in FIG. 5. The method 70 includes an iterative process that performs successive hydrogen concentration estimations until a convergence is reached. The method may be performed in conjunction with system 10 but is not so limited.

In stage 71, an initial temperature value (T) is computed using return measurement signals without any calibration or correction for hydrogen concentration. The temperature T can be computed for one or multiple locations (e.g., distributed temperature measurements). In stage 72, an initial hydrogen concentration (H) is estimated using the return reference signal and initial temperature T. In stage 73, the temperature T is re-computed (referred to as corrected T or $T_{cor}$) by correcting the temperature T using the estimated concentration H as an input hydrogen concentration ($H_{input}$). In stage 74, a revised hydrogen concentration ($H_{rev}$) is estimated using the re-computed temperature T. In stage 75, the revised concentration $H_{rev}$ is compared to the input concentration $K_{input}$. If $H_{rev}$ is within a selected tolerance or agreement with $H_{input}$, $H_{rev}$ is used for calibration. If $H_{rev}$ is not within the selected tolerance, stages 73-75 are repeated as another iteration using $H_{rev}$ as the input into stage 73. Iterations are repeated until hydrogen concentration values are estimated that sufficiently converge.

The methods described herein could be used in conjunction with other techniques where appropriate for calibration. For example, in addition to measuring loss due to non-measurement parameters using the method 50, additional techniques can be used to measure loss due to other parameters. Such additional techniques include, e.g., techniques for measuring permanent change in the fiber due to reactions with OH.

The methods described herein can also be used to correct for permanent loss changes. For example, the formation of the hydroxyl permanent loss is a function of the time, temperature and hydrogen level the fiber has seen. The system 10 can be used to track these parameters and accumulate a history of the exposure. For example, if the permanent change is proportional to the total hydrogen exposure, the permanent change can be calculated as an integration of the hydrogen level measured through time.

The systems and methods described herein provide various advantages over prior art techniques. A DTS system as described herein can be substantially more accurate in environments with substantial hydrogen ingress. In addition, the systems and methods can provide real time and distributed calibration and/or updates to calibrations.

Prior art techniques tend to increase cost and complexity of downhole systems. For example, the addition of discrete temperature gauges to the system can help to maintain calibration at particular locations along the fiber. Additionally, the DTS can be a dual-ended system, in which two optical fibers are present and are connected at the bottom of the well such that light travels down one fiber and up the other. By measuring temperature using SRS in both directions, it is possible to separate changes due to temperature from changes due to fiber loss changes. The disadvantage of a dual-ended system with point temperature gauges is that this adds cost to the system, requiring at least twice the fiber and added gauges to monitor and additional components downhole. Generally, components downhole are expensive to assemble and at greater risk for failure than components above ground.

In contrast, the systems and methods described herein can be employed with a relatively low cost. For example, the reference signal can be generated by a relatively inexpensive second laser. In addition, in some embodiments, the measurement and calibration can be performed via the same fiber, thus reducing the number of required downhole components.

The optical fiber assembly 22 and/or the measurement system are not limited to the embodiments described herein, and may be disposed with any suitable carrier. The measurement system, optical fiber assembly 22, the borehole string 14 and/or the tool 18 may be embodied with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In support of the teachings herein, various analysis components may be used, including a digital and/or an analog system. Components of the system, such as the measurement unit 20 may have components such as a processor, storage media, memory, input, output, communications link, user interfaces, software programs, signal processors (digital or analog) and other such components (such as resistors, capacitors, inductors and others) to provide for operation and analyses of the apparatus and methods disclosed herein in any of several manners well appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling unit, heating unit, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a parameter, the apparatus comprising:
   an optical fiber sensor including a measurement optical fiber configured to be disposed in a downhole location, the measurement optical fiber including at least one sensing location disposed along the measurement optical fiber and configured to generate measurement signals;
   a reference optical fiber configured to be disposed in a downhole location, the reference optical fiber having a greater sensitivity to hydrogen diffusion than the measurement optical fiber;
   at least one light source configured to transmit a measurement signal into the measurement optical fiber having a wavelength to interrogate a sensing location and cause the sensing location to return a reflected measurement signal indicative of a measured parameter, and configured to transmit a reference signal into the reference optical fiber and cause a reflected reference signal to be returned from a location associated with the sensing location, the reflected reference signal having a known relationship to hydrogen concentration; and
   a processor configured to receive the reflected measurement signal and the reflected reference signal, estimate the hydrogen concentration based on the reflected reference signal, and calibrate the first reflected signal based on the estimated hydrogen concentration.

2. The apparatus of claim 1, wherein the measurement signal wavelength is a first wavelength having a loss associated with the measured parameter and the hydrogen concentration, and the reference signal wavelength is a second wavelength having a loss that is primarily dependent on the hydrogen concentration.

3. The apparatus of claim 2, wherein the reference optical fiber is configured to absorb hydrogen at a faster rate than the measurement optical fiber.

4. The apparatus of claim 1, wherein the processor is configured to estimate a rate of diffusion of hydrogen into the reference fiber, predict a rate of diffusion into the measurement fiber based on the estimated rate of diffusion, and calibrate the reflected measurement signal based on the estimated rate of diffusion.

5. The apparatus of claim 1, wherein the reference optical fiber is made of a first material that causes significant signal loss based only on the hydrogen concentration, and the measurement optical fiber is made of a second material that causes significant signal loss based on the hydrogen concentration and at least one additional parameter.

6. The apparatus of claim 5, wherein the reference optical fiber has a high sensitivity to hydrogen diffusion relative to the measurement optical fiber.

7. The apparatus of claim 6, wherein the processor is configured to estimate a rate of diffusion of hydrogen into the reference fiber, predict a rate of diffusion into the measurement fiber based on the estimated rate of diffusion, and calibrate the reflected measurement signal based on the estimated rate of diffusion.

8. The apparatus of claim 1, wherein the at least one optical fiber includes a plurality of sensing locations arrayed along the measurement length.

9. The apparatus of claim 8, wherein the plurality of sensing locations are locations of spontaneous Raman scattering.

10. The apparatus of claim 1, wherein the at least one light source is configured to transmit the measurement signal into an end of the at least one optical fiber, the reflected measurement signal includes light back scattered from the sensing location, and the processor is configured to receive the reflected measurement and reference signals at the same end.

11. A method for estimating a parameter, the method comprising:
    disposing a measurement optical fiber in a downhole location, the measurement optical fiber including at least one sensing location disposed along the optical fiber and configured to generate measurement signals;
    disposing a reference optical fiber in a downhole location, the reference optical fiber having a greater sensitivity to hydrogen diffusion than the measurement optical fiber;
    transmitting a measurement signal having a wavelength into the measurement optical fiber to interrogate a sensing location and cause the sensing location to return a reflected measurement signal indicative of a measured parameter;
    transmitting a reference signal into the reference optical fiber and causing a reflected reference signal to be returned from a location associated with the sensing location, the reflected reference signal having a known relationship to hydrogen concentration; and
    receiving the reflected measurement signal and the reflected reference signal, estimating the hydrogen concentration based on the reflected reference signal, and calibrating the first reflected signal based on the estimated hydrogen concentration.

12. The method of claim 11, wherein the measurement signal wavelength is a first wavelength having a loss associated with the measured parameter and the hydrogen concentration, and the reference signal wavelength is a second wavelength having a loss that is primarily dependent on the hydrogen concentration.

13. The method of claim 12, wherein the reference optical fiber is configured to absorb hydrogen at a faster rate than the measurement optical fiber.

14. The method of claim 11, wherein calibrating includes estimating a rate of diffusion of hydrogen into the reference fiber, predicting a rate of diffusion into the measurement fiber based on the estimated rate of diffusion, and calibrating the reflected measurement signal based on the estimated rate of diffusion.

15. The method of claim 11, wherein the reference optical fiber is made of a first material that causes significant signal loss based only on the hydrogen concentration, and the measurement optical fiber is made of a second material that causes significant signal loss based on the hydrogen concentration and at least one additional parameter.

16. The method of claim 15, wherein the reference optical fiber has a high sensitivity to hydrogen diffusion relative to the measurement optical fiber.

17. The method of claim 16, wherein calibrating includes estimating a rate of diffusion of hydrogen into the reference fiber, predicting a rate of diffusion into the measurement fiber based on the estimated rate of diffusion, and calibrating the reflected measurement signal based on the estimated rate of diffusion.

18. The method of claim 11, wherein the at least one optical fiber includes a plurality of sensing locations arrayed along the measurement length.

19. The method of claim 18, wherein the plurality of sensing locations are locations of spontaneous Raman scattering.

20. The method of claim 11, wherein estimating the hydrogen concentration includes estimating a rate of diffusion of hydrogen into the reference fiber and calibrating the reflected measurement signal based on the estimated rate of diffusion.

* * * * *